US009888557B2

(12) United States Patent
Sugimoto et al.

(10) Patent No.: US 9,888,557 B2
(45) Date of Patent: Feb. 6, 2018

(54) PLASMA SPRAYING APPARATUS

(71) Applicants: FUJI ENGINEERING CO., LTD., Osaka (JP); FUJIGIKEN CO., LTD., Osaka (JP); WEST NIPPON EXPRESSWAY COMPANY LIMITED, Osaka (JP)

(72) Inventors: Masanobu Sugimoto, Osaka (JP); Kenichi Yamada, Fukuoka (JP); Masanobu Irie, Fukuoka (JP)

(73) Assignees: FUJI ENGINEERING CO., LTD., Osaka (JP); FUJIGIKEN CO., LTD., Osaka (JP); WEST NIPPON EXPRESSWAY COMPANY LIMITED, Osaka (JP)

( * ) Notice: Subject to any disclaimer, the term of this patent is extended or adjusted under 35 U.S.C. 154(b) by 890 days.

(21) Appl. No.: 13/716,734

(22) Filed: Dec. 17, 2012

(65) Prior Publication Data

US 2014/0166630 A1 Jun. 19, 2014

(51) Int. Cl.
*B23K 10/00* (2006.01)
*H05H 1/42* (2006.01)
*H05H 1/34* (2006.01)

(52) U.S. Cl.
CPC ................ *H05H 1/42* (2013.01); *H05H 1/34* (2013.01); *H05H 2001/3457* (2013.01)

(58) Field of Classification Search
CPC ........ B23K 10/00; B23K 26/08; B23K 26/34; B05B 7/22; C23C 4/00
USPC .................................. 219/75, 121.36–121.59
See application file for complete search history.

(56) References Cited

U.S. PATENT DOCUMENTS

| | | | | |
|---|---|---|---|---|
| 4,136,273 | A * | 1/1979 | Eujita | B23K 9/1675 219/121.36 |
| 4,370,538 | A * | 1/1983 | Browning | 219/121.59 |
| 4,762,977 | A * | 8/1988 | Browning | B05B 7/224 219/121.47 |
| 4,767,907 | A * | 8/1988 | Otani et al. | 219/121.56 |
| 5,296,667 | A * | 3/1994 | Marantz et al. | 219/121.47 |
| 5,976,704 | A * | 11/1999 | McCune | 428/469 |
| 5,977,504 | A * | 11/1999 | Offer et al. | 219/75 |
| 6,663,013 | B1 * | 12/2003 | Vanden Heuvel et al. | 239/83 |

FOREIGN PATENT DOCUMENTS

JP 9-308970 12/1997

OTHER PUBLICATIONS

English translation of JP H09-308970 to Shimazu published Feb. 12, 1997.*

* cited by examiner

*Primary Examiner* — Michael Laflame, Jr.
(74) *Attorney, Agent, or Firm* — Wenderoth, Lind & Ponack, L.L.P.

(57) ABSTRACT

A plasma spraying apparatus includes a cathode, a first gas nozzle surrounding a head of the cathode therewith to form a first gas path outside of the cathode, and a second gas nozzle surrounding the first gas nozzle therewith to form a second gas path outside of the first gas nozzle. The second gas nozzle is formed with a wire path through which a wire is inserted such that a distal end of the wire is disposed in front of a nozzle opening of the second gas nozzle. The wire path has a substantially rectangular cross section having a longer side extending in a direction in which a plasma flame extends, the wire path causing the wire to bend within an elastic limit of the wire.

18 Claims, 5 Drawing Sheets

| CROSS-SECTION OF WIRE PATH | CROSS-SECTIONAL VIEW | DIRECTION OF FORCE | POSITION OF WIRE |
|---|---|---|---|
| CROSS SECTION A |  |  | FIXED |
| CROSS SECTION B |  |  | FIXED |
| CROSS SECTION C |  |  | FIXED |
| CIRCULAR CROSS-SECTION |  |  | NOT FIXED |
| ELONGATED CIRCULAR CROSS-SECTION |  |  | NOT FIXED |

PLASMA SPRAYING APPARATUS

The entire disclosure of Japanese Patent Application No. 2010-276141 filed on Dec. 10, 2010 including the specification, claims, drawings and summary is incorporated herein by reference in its entirety.

BACKGROUND OF THE INVENTION

Field of the Invention

The invention relates to a plasma spraying apparatus which transfers plasma-arc to an electrically conductive wire to thereby generate plasma flame, melts the wire into droplets, and sprays the droplets onto a target.

Description of the Related Art

FIG. 1 is a cross-sectional view of a conventional plasma spraying apparatus.

As illustrated in FIG. 1, the conventional plasma spraying apparatus 90 includes a first gas nozzle 91 defining a first gas path 91*a*, a second gas nozzle 92 disposed outside of the first gas nozzle 91 to define a second gas path 92*a*, a cathode 93 disposed substantially on central axes of both a nozzle opening 91*b* of the first gas nozzle 91 and a nozzle opening 92*a* of the second gas nozzle 92, a battery unit 94, and a wire guide hole 95 for introducing an electrically conductive wire W to be sprayed, into a vicinity of the nozzle opening 92*a* of the second gas nozzle 92.

The wire W is supplied obliquely of a central axis of the nozzle opening 92*a* and in front of the nozzle opening 92*a* through the wire guide hole 95. A first gas sprayed through the first gas path 91*a* is turned into plasma flame F by means of arc generated between the wire W indirectly electrically connected to an anode of the battery unit 94 through the second gas nozzle 92, and the cathode 93 electrically connected to a cathode of the battery unit 94. The thus generated plasma flame F melts the wire W into droplets D, and sprays the droplets D. The droplets D are further reduced in size and further accelerated by a second gas sprayed forwardly of the second gas nozzle 92 through the second gas path 92*a*, and sprayed onto a target T to thereby form a sprayed coating S on the target T.

In a plasma spraying apparatus in which the wire W is molten into the droplets D by means of the plasma flame F and a second gas flow, and the droplets D are sprayed onto the target T, it is necessary to stably generate plasma flame F, and it is also necessary for a tip end of the wire W to be always disposed within the plasma flame F in order to uniformly spray the droplets D.

However, in the conventional plasma spraying apparatus, the wire guide hole 95 through which the wire W is supplied has a circular cross-section, and is designed to have a greater diameter than that of the wire W in order to prevent the wire W from being hooked or clogged in the wire guide hole 95 due to deformation the wire W originally has. Accordingly, it is difficult to supply the wire W with the distortion of the wire W being reformed, and thus, the wire W repeats going out of and going back to a center of the plasma flame F due to the original deformation of the wire W. Thus, the conventional plasma spraying apparatus is accompanied with a problem that it is not possible to stably supply the wire W to a center of the plasma flame F.

In order to solve the above-mentioned problem, for instance, Japanese Patent Application Publication No. H9 (1997)-308970 has suggested a plasma spraying apparatus including a first guide for reforming original deformation of a wire inserted into a support plate formed integral with a plasma arc torch, and a second guide for guiding the wire from the first guide, and causing the wire W to bend beyond elastic limit thereof. The wire is supplied after the original deformation of the wire was removed, and a tip end of the wire is kept at a center of plasma gas flow to thereby stably generate plasma flame.

However, as suggested in the above-mentioned Publication, if the second guide were integrated with the plasma arc torch for causing a wire to bend beyond elastic limit, a force for feeding a wire would become excessive, because the second guide causes a wire to bend elastic limit thereof. Accordingly, a wire feeding unit is inevitably big-sized, and the torch would be big-sized at its entirety.

SUMMARY OF THE INVENTION

In view of the above-mentioned problem in the conventional plasma spraying apparatus, it is an object of the present invention to provide a plasma spraying apparatus which is capable of stably feeding a wire without including a second guide for causing a wire to bend beyond elastic limit, in spite of deformation which a wire originally has, in the case that a wire is to be supplied into a vicinity of a nozzle opening of a second gas nozzle.

In one aspect of the present invention, there is provided a plasma spraying apparatus including a cathode, a first gas nozzle surrounding a head of the cathode therewith to form a first gas path between the cathode and the first gas nozzle, and a second gas nozzle surrounding the first gas nozzle therewith to form a second gas path between the first gas nozzle and the second gas nozzle, wherein the second gas nozzle is formed with a wire path through which a wire is inserted such that a distal end of the wire is disposed in front of a nozzle opening of the second gas nozzle, a first gas sprayed through the first gas nozzle is turned into plasma flame by arc generated between the cathode and the distal end of the wire, the distal end of the wire is molten into droplets by the plasma flame, and the droplets are sprayed onto a target by means of both the plasma flame and a second gas sprayed through the second gas nozzle, and the wire path has a substantially rectangular cross-section having a longer side extending in a direction in which the plasma flame extends, the wire path causing the wire to bend within elastic limit of the wire.

In the plasma spraying apparatus in accordance with the present invention, a wire is caused to bend within elastic limit thereof to thereby allow the original deformation of a wire to release in a direction in which plasma flame extends. Thus, it is possible to prevent a wire from moving in a direction perpendicular to a direction in which plasma flame extends. It should be noted that even if a wire moves at a tip end thereof in a direction in which plasma flame extends, since the tip end is disposed on a central axis of the plasma flame, the plasma flame is prevented from being instable. Thus, the plasma spraying apparatus in accordance with the present invention makes it possible to stably supply a wire to a center of plasma flame.

It is preferable that the cross-section of the wire path has a shorter side having a length greater than a diameter of the wire by 3 to 10% only 3 inclusive.

By designing the wire to have such a shorter side, it is possible to allow the original deformation of a wire to release only in a direction in which plasma flame extends, and to prevent a wire from moving in a direction perpendicular to a direction in which plasma flame extends.

If the shorter side of the wire were greater than a diameter of the wire path by X % ($X<3$), there would be just an insufficient space for allowing the original deformation of the wire to release in a direction in which plasma flame extends, the wire might be hooked or clogged in the wire path. If the shorter side of the wire path were greater than a diameter of the wire by 10% or more, the space would be too large, resulting in that the original deformation of the wire would be released not only in a direction in which plasma flame extends, but also in a direction perpendicular to a direction in which plasma flame extends.

It is preferable that the wire path includes a first wire path having an exit disposed in the vicinity of a nozzle opening of the second gas nozzle, and a second wire path inclining relative to the first wire path by a predetermined angle.

When a wire is fed into the first wire path from the second wire path, the wire is caused to bend within elastic limit due to the predetermined angle formed between the first and second wire paths, resulting in that it is possible to allow the original deformation of a wire to release only in a direction in which plasma flame extends, and to prevent a wire from moving in a direction perpendicular to a direction in which plasma flame extends.

It is preferable that the predetermined angle is in the range of 1 to 5 degrees both inclusive.

The predetermined angle in this range makes it possible to cause a wire to bend within elastic limit, and stably supply a wire to a center of plasma flame.

If the predetermined angle were smaller than 1 degree, the angle could not cause a wire to bend in a desired degree with the result that a wire is instably fed. If the predetermined angle were greater than 5 degrees, a wire might be caused to bend beyond elastic limit.

It is preferable that the first and second wire paths are spaced away from each other, preferably by 3 to 10 millimeters both inclusive.

The first wire path, the second wire path, and a space between them artificially form a curved wire path to thereby cause a wire to bend within elastic limit.

If the space between the first and second wire paths is smaller than 3 mm, the wire path would be considered to substantially comprise only the first wire path. If the space would be greater than 10 mm, the second wire path could not provide effective bending to a wire, in which case, the wire path is considered to substantially comprise only the first wire path.

The plasma spraying apparatus may be designed to further include a third gas nozzle disposed between the first gas nozzle and the second gas nozzle to form a third gas path between the first gas nozzle and the third gas nozzle.

It is preferable that the cross-section of the wire path is chamfered at corners thereof such that the wire does not make contact with the corners.

It is preferable that the cross-section of the wire path is rounded at corners thereof such that the wire does not make contact with the corners.

It is preferable that at least one of the first wire path and the second wire path is linear or curved.

It is preferable that the first wire path has a substantially rectangular cross-section.

It is preferable that the second wire path has a substantially rectangular cross-section.

The advantages obtained by the aforementioned present invention will be described hereinbelow.

Firstly, since the wire path has a substantially rectangular cross-section having a longer side extending in a direction in which plasma flame extends, and causes a wire to bend within elastic limit thereof, it is possible to release the original deformation of a wire in a direction in which plasma flame extends, prevent a wire from moving in a direction perpendicular to a direction in which plasma flame extends, and stably feed a wire into a center of plasma flame, without designing the plasma spraying apparatus to include a second guide for causing a wire to bend beyond elastic limit.

Secondly, the wire path has a substantially rectangular cross-section having a shorter side having a length greater than a diameter of a wire by 3 to 10% only 3 inclusive. Thus, it is possible to allow the original deformation of a wire to release only in a direction in which plasma flame extends, and to prevent a wire from moving in a direction perpendicular to a direction in which plasma flame extends. As a result, it is possible to stably supply a wire into a center of plasma flame.

Thirdly, the wire path comprises a first wire path having an exit disposed in the vicinity of a nozzle opening of the second gas nozzle, and a second wire path inclining relative to the first wire path by a predetermined angle, for instance, by 1 to 5 degrees both inclusive. Thus, it is possible to cause a wire to bend within elastic limit, and hence, it is possible to stably supply a wire into a center of plasma flame.

Fourthly, the first and second wire paths are spaced away from each other, for instance, by 3 to 10 millimeters both inclusive. Thus, there can be artificially formed a curved wire path bigger than the first and second wire paths, ensuring a wire to bend within elastic limit thereof.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

Figure 1:
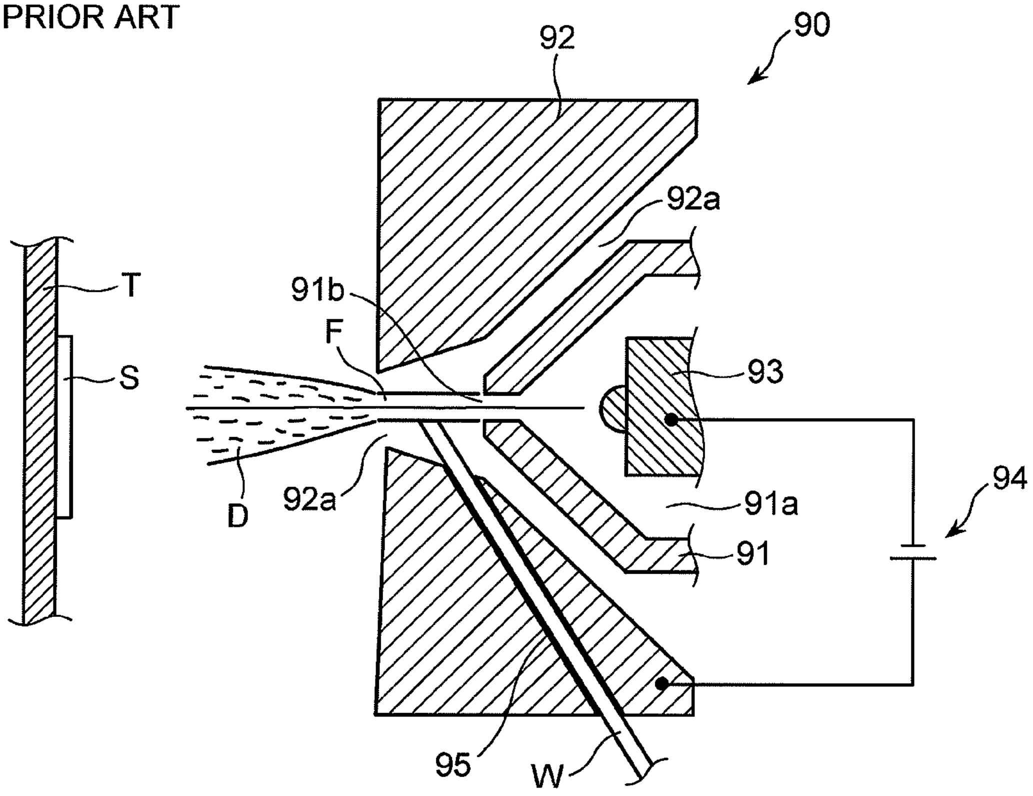
FIG. 1 PRIOR ART
FIG. 1 is a cross-sectional view of a conventional plasma spraying apparatus.
Figure 2:
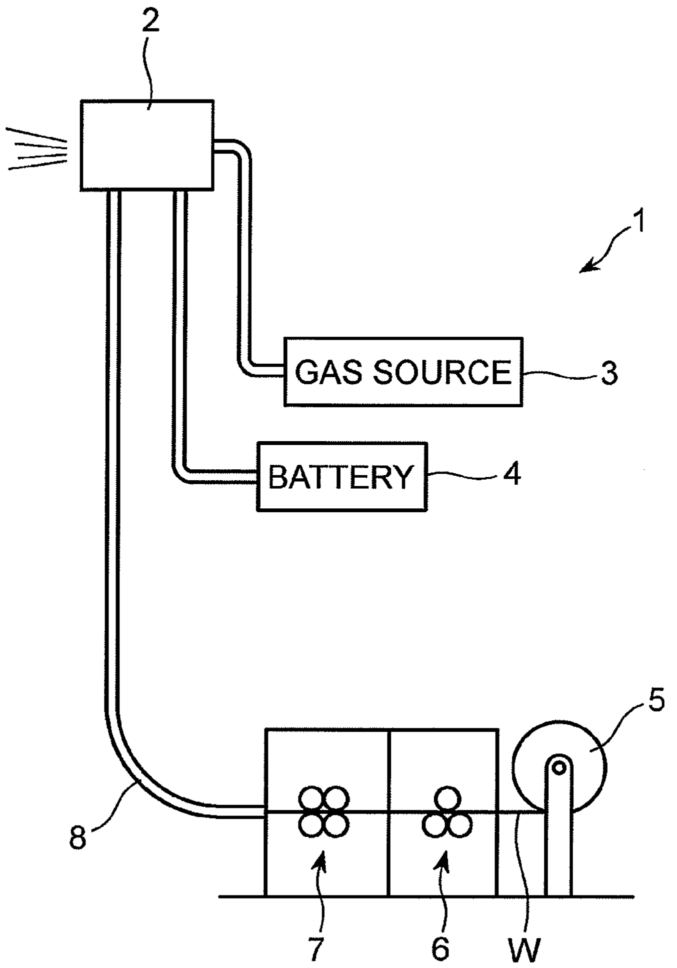
FIG. 2 is a schematic view of the plasma spraying apparatus in accordance with the preferred embodiment of the present invention.
Figure 3:
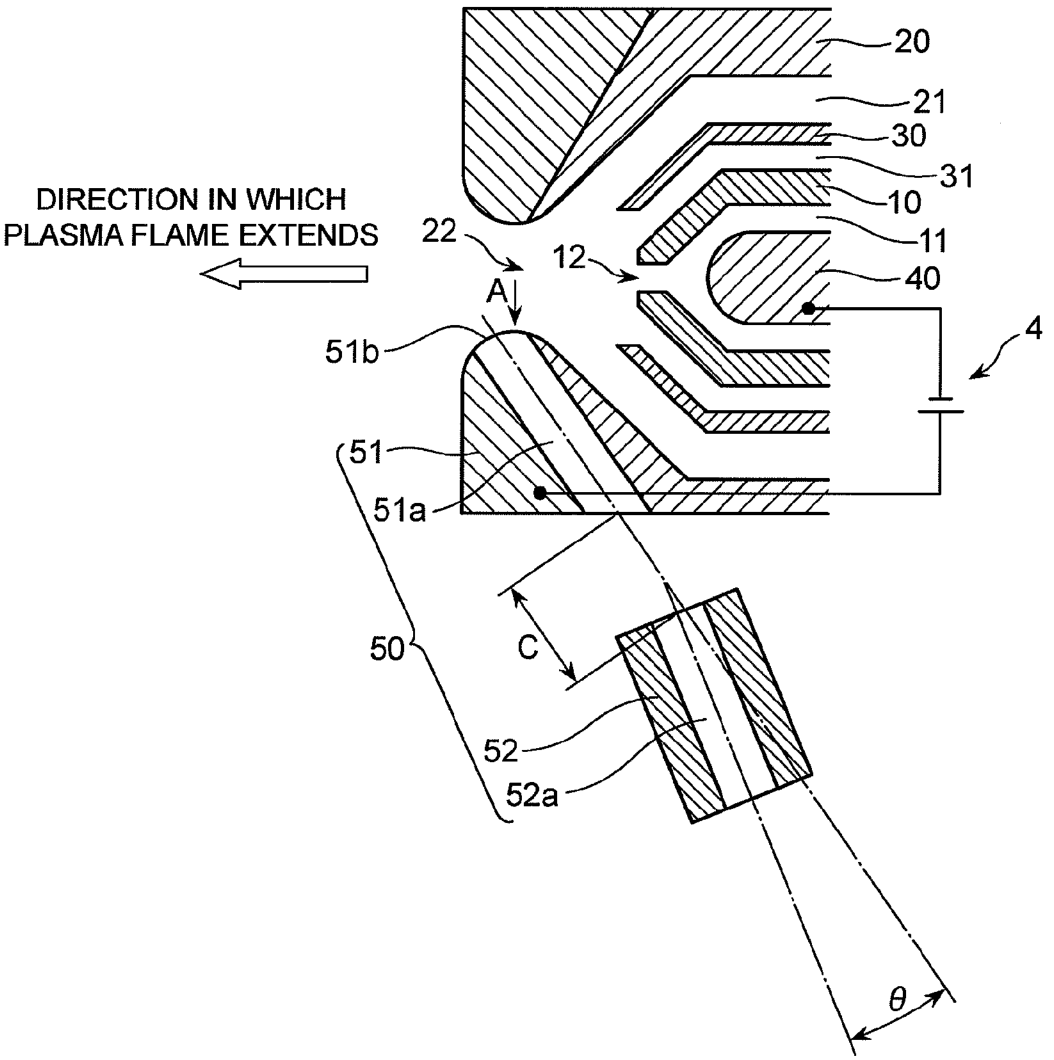
FIG. 3 is a longitudinal cross-sectional view of a main part of a plasma spraying torch illustrated in FIG. 2.
Figure 4:
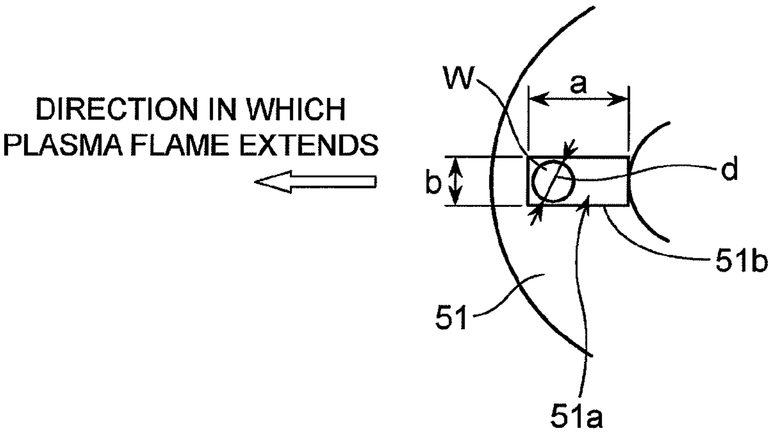
FIG. 4 is an enlarged view seen from an arrow A shown in FIG. 3.
Figure 5:
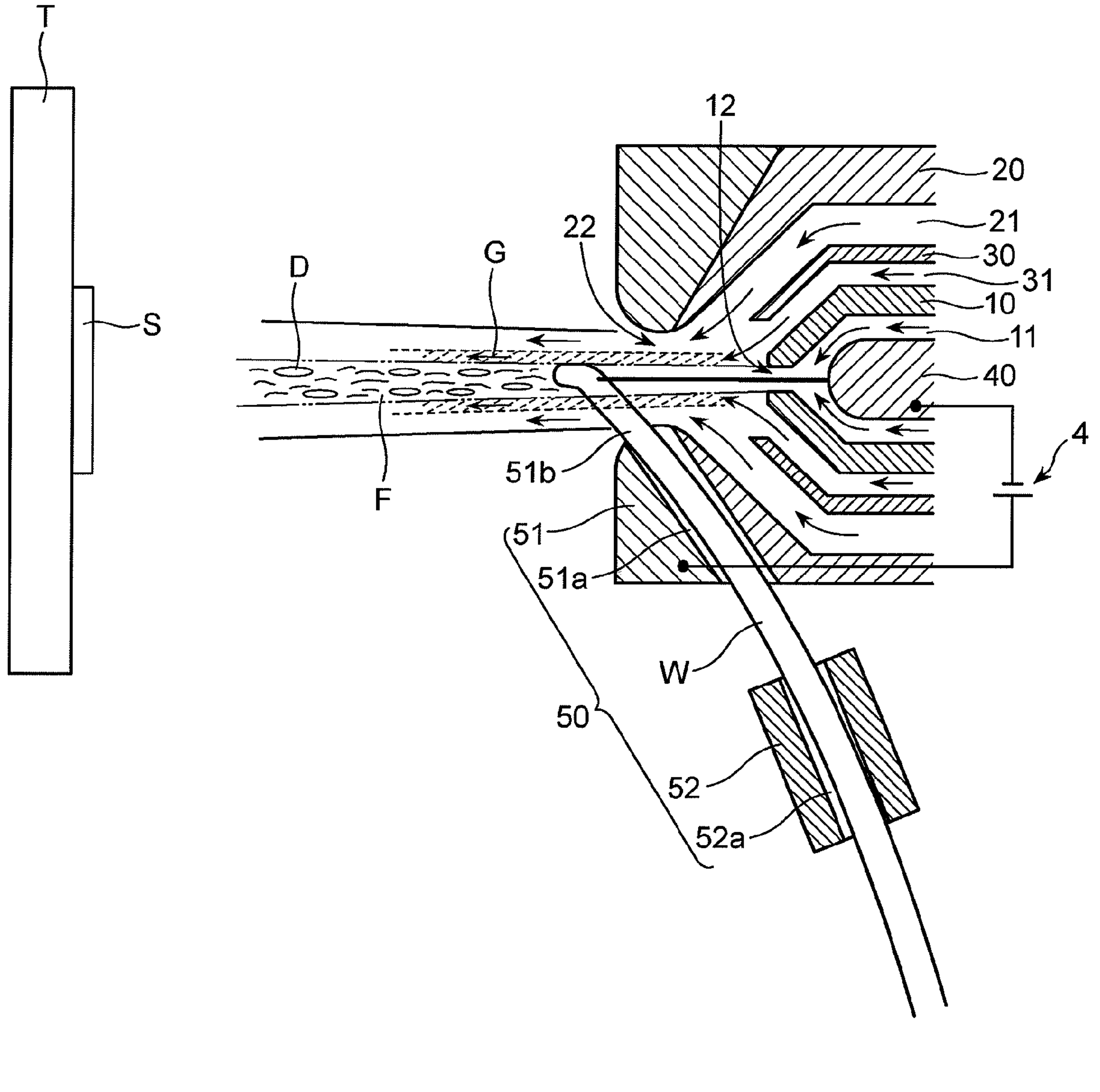
FIG. 5 is a view showing the action of the plasma spraying torch illustrated in FIG. 3.

FIG. 2 is schematic view of the plasma spraying apparatus in accordance with the preferred embodiment of the present invention, FIG. 3 is a longitudinal cross-sectional view of a main part of a plasma spraying torch illustrated in FIG. 2, FIG. 4 is an enlarged view seen from an arrow A shown in FIG. 3, and FIG. 5 is a view showing the action of the plasma spraying torch illustrated in FIG. 3.

As illustrated in FIG. 2, the plasma spraying apparatus 1 in accordance with the preferred embodiment of the present invention includes a plasma spraying torch 2 for spraying droplets generated by melting a wire W by means of plasma flame, onto a target, a gas source 3 for supplying a first gas and a second gas to the plasma spraying torch 2, a battery 4 for supplying electric power to the plasma spraying torch 2, a wire reel 5 around which a wire W is wound, a wire straightener 6 for straightening the wire W unwound from the wire reel 5, and a wire feeder 7 for feeding the wire W to the plasma spraying torch 2 through a wire-feeding tube 8.

As illustrated in FIG. 3, the plasma spraying torch 2 includes a first gas nozzle 10 defining a first gas path 11, a second gas nozzle 20 disposed outside of the first gas nozzle 10 and defining a second gas path 21, a third gas nozzle 30 disposed between the first gas nozzle 10 and the second gas nozzle 20 and defining a third gas path 31, a cathode 40 disposed substantially on central axes of both a nozzle opening 12 of the first gas nozzle 10 and a nozzle opening 22 of the second gas nozzle 20, and a wire path 50 for feeding a wire W to be sprayed, into a vicinity of the nozzle opening 22 of the second gas nozzle 20.

The first gas nozzle 10 surrounds a head of the cathode 40 such that the first gas path 11 is defined between the first gas nozzle 10 and the cathode 40. A first gas comprising an inert gas such as a nitrogen gas or an argon gas is supplied into the first gas path 11. As an alternative, compressed air may be used as the first gas. The first gas supplied through the first gas path 11 is sprayed through the nozzle opening 12 of the first gas nozzle 10 towards the nozzle opening 22 of the second gas nozzle 20.

The third gas nozzle 30 surrounds the first gas nozzle 10 such that the third gas path 31 is defined between the first gas nozzle 10 and the third gas nozzle 30. A third gas to be supplied into the third gas path 31 comprises compressed air or a carbon dioxide gas, for instance.

The second gas nozzle 20 surrounds the third gas nozzle 30 such that the second gas path 21 is defined between the third gas nozzle 30 and the second gas nozzle 20. A second gas to be supplied into the second gas path 21 comprises compressed air or a carbon dioxide gas, for instance.

The wire path 50 includes a first wire path 51*a* having a wire exit 51*b* formed in the vicinity of the nozzle opening 22 of the second gas nozzle 20, and a second wire path 52*a* through which the wire W is supplied at a predetermined angle relative to the first wire path 51*a*.

The wire path 50 causes the wire W to bend within elastic limit thereof by means of the first wire path 51*a* and the second wire path 52*a*.

As illustrated in FIG. 4, the first wire path 51*a* has a substantially rectangular cross-section extending in a direction in which the plasma flame extends, and is formed by linearly passing through a first wire guide 51 disposed outside of the second gas nozzle 20. Similarly, the second wire path 52*a* has a substantially rectangular cross-section extending in a direction in which the plasma flame extends, and is formed by linearly passing through a second wire guide 52 disposed away from the first wire path 51*a*.

A length “a” of a longer side of the first wire path 51*a* is designed to be longer than a diameter “d” of the wire W by 10% to 95% both inclusive. A length “b” of a shorter side of the first wire path 51*a* is designed to be longer than a diameter “d” of the wire W by 3% to 10% only 3% inclusive.

In the current embodiment, the wire W has a diameter of 1.6 mm, a longer side of the first wire path 51*a* has a length “a” longer than a diameter “d” of the wire W by about 0.2 to about 1.5 mm, and a shorter side of the first wire path 51*a* has a length “b” longer than a diameter “d” of the wire W by about 0.05 to about 0.15 mm. The longer and shorter sides of the second wire path 52*a* are designed to have the same lengths as those of the first wire path 51*a*.

It should be noted that the substantially rectangular cross-sections of both the first wire path 51*a* and the second wire path 52*a* may be chamfered or rounded at corners unless the corners make contact with the wire W. Accordingly, only a force oriented perpendicular to the longer or shorter side of both the first wire path 51*a* and the second wire path 52*a* acts on the wire W in the current embodiment in the first wire path 51*a* and the second wire path 52*a*.

An inclination angle θ formed between the first wire path 51*a* and the second wire path 52*a* is defined as an angle formed between a central axis of the first wire path 51*a* and a central axis of the second wire path 52*a*. In the current embodiment, the inclination angle θ is set in the range of about 1 to about 5 degrees both inclusive.

The second wire guide 52 through which the second wire path 52*a* passes is disposed away from the first wire path 51*a* by a space “c”. In the current embodiment, the space “c” is set in the range of about 3 to about 10 mm both inclusive.

In the plasma spraying torch 2 in the current embodiment, as mentioned above, since the first wire path 51*a* and the second wire path 52*a* are spaced away from each other by a space “c”, the first wire path 51*a* and the second wire path 52*a*, both of which are linear, cooperate with each other to artificially define the curved wire path 50 to thereby cause the wire W to bend within elastic limit.

Though the first wire path 51*a* and the second wire path 52*a* are designed linear in the current embodiment, they may be designed curved.

The battery 4 is electrically connected at an anode thereof with the first wire guide 51, and hence, is indirectly electrically connected with the wire W inserted into the first wire path 51*a* formed through the first wire guide 51. The battery 4 is electrically connected at a cathode thereof with the cathode 40. The battery 4 may be directly electrically connected at an anode thereof with the wire W.

In the plasma spraying apparatus 1 having the above-mentioned structure, when the wire W wound around the wire reel 5 is fed to the plasma spraying torch 2 through the wire feeder 7, the original deformation of the wire W, that is, the intensive characteristic by which the wire W tends to be curled, is removed by means of the wire straightener 6, and thus, the wire W is straightened to a slightly curled condition.

Then, the wire W is fed to the wire path 50 through the wire-feeding tube 8. In the wire path 50, only a force oriented perpendicular to a longer side or a shorter side of both the first wire path 51*a* and the second wire path 52*a* acts on the wire W, and thus, as illustrated in FIG. 5, the wire W is caused to bend within elastic limit thereof in a direction in which the plasma flame F extends.

Since both the first wire path 51*a* and the second wire path 52*a* are designed to have a rectangular cross-section having a longer side extending in a direction in which the plasma flame F extends, the original deformation of the wire W is released in a direction in which the plasma flame F extends. In particular, in the current embodiment, since the shorter side of the first wire path 51*a* and the second wire path 52*a* is designed to have a length “b” greater than a diameter “d” of the wire W by X % ($3 \leq X < 10$), the original deformation of the wire W is not released in a direction perpendicular to a direction in which the plasma flame F extends. Accordingly, even if a tip end of the wire W were slightly shifted in a direction in which the plasma flame F extends, the tip end is prohibited from shifting in a direction perpendicular to a direction in which the plasma flame F extends, and thus, it is ensured that the tip end of the wire W is disposed on an axis of the plasma flame F.

Figure 6:
FIG. 6 shows a relation between a cross-section of the wire path and a direction in which a force acts on the wire.
Figure 6:
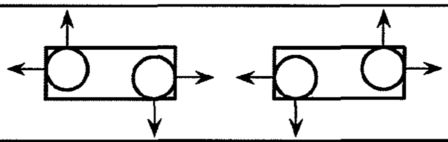
Figure 6:
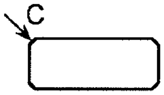
Figure 6:
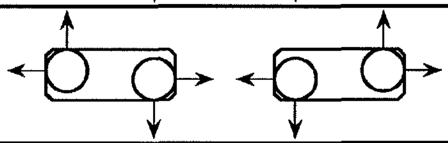
Figure 6:
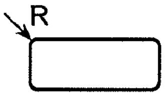
Figure 6:
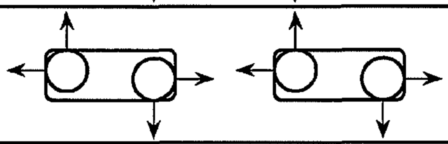
Figure 6:
Figure 6:
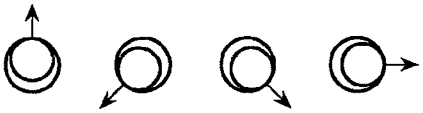
Figure 6:
Figure 6:

FIG. 6 shows a relation between a cross-section of the wire path 50 and a direction in which a force acts on the wire W.

In FIG. 6, the cross-section A indicates a rectangular cross-section, the cross-section B indicates a rectangular cross-section which is chamfered at corners such that the wire W does not make contact with the chamfered corners, and the cross-section C indicates a rectangular cross-section which is rounded at corners such that the wire W does not make contact with the rounded corners.

In these cross-sections A, B and C, when the wire W makes contact with not only a longer side, but also a shorter side, only a force oriented perpendicular to the longer side and shorter side acts on the wire W.

Since it is not possible to completely straighten the wire W even by the wire straightener 7, the wire W unavoidably has the original deformation, specifically, a characteristic of curling. Furthermore, the wire-feeding tube 8 is varied into various shapes in dependence on a position of the plasma spraying torch 2 in assembling the plasma spraying apparatus 1, and hence, cannot keep a uniform shape. Thus, when the wire W having the original deformation is being fed through the wire-feeding tube 8 which is not capable of keeping a uniform shape, a bending force and/or a torsion force act on the wire W in dependence on a shape of the wire-feeding tube 8. The wire W randomly bends like a spring in elastic limit thereof by such forces, and is fed in meandering condition through the wire-feeding tube 8 in a route at which the forces are stabilized.

While the wire W is being fed in the wire path 50, when the wire W makes contact with a shorter side of the above-mentioned cross-section A, B or C, a force oriented perpendicular to a shorter side, that is, a force oriented in parallel with a direction (hereinafter, referred to as "direction X") in which the plasma flame F extends acts on the wire W, and hence, the original deformation is released in the direction X. If a force oriented in a direction (hereinafter, referred to as "direction Y") perpendicular to the direction X acts on the wire W while the wire W makes contact only with a shorter side, the wire W randomly moves by spaces formed in the length "b", and makes contact with a longer side, however, in which case, since a force oriented in a direction perpendicular to a longer side, that is, in the direction Y acts on the wire W, the wire W is able to stably keep its position.

In contrast, when the wire W makes contact with a curved surface of a circular cross-section or an elongated circular cross-section, since a force oriented perpendicular to the curved surface, the wire W can freely move along the curved surface. In particular, when a torsion force acts on the wire W, the wire W freely rotates along a curved surface, and hence, the wire W is not prevented from being distorted. Thus, a direction in which a torsion force acts on the wire W is not fixed, and hence, a position of the wire W is not fixed.

As mentioned above, the plasma spraying apparatus 1 in accordance with the present embodiment makes it possible to stably supply the wire W at its tip end to a center of the plasma flame F. The first gas sprayed through the first gas path 11 is turned into the plasma flame F by both the wire W indirectly electrically connected to an anode of the battery 4 through the first wire guide 51, and the cathode 40 electrically connected to a cathode of the battery 4. The plasma flame F melts the wire W into droplets D, and sprays the droplets D. The droplets D are reduced in size and further accelerated by the second gas sprayed through the second gas path 21 and leaving the second gas nozzle 20, and sprayed onto the target T to thereby form the sprayed coating S.

In the plasma spraying apparatus 1 in accordance with the present embodiment, a third gas flow sprayed through the third gas path 31 defined between the first gas path 11 and the second gas path 21 absorbs heat from the plasma flame F to thereby generate a high-temperature gas jet G. The high-temperature gas jet G drastically restricts the second gas sprayed outside of the gas jet G to thereby weaken turbulence generated externally of the plasma flame F, resulting in that a gas of the plasma flame F is prevented from dispersing, and surfaces of the droplets D are reduced in being oxidized. Thus, it is possible to form the sprayed coating S which is difficult to be oxidized, onto the target T.

In the case that the third gas comprises an inert gas such as a nitrogen gas or an argon gas, as mentioned above, the third gas drastically restricts the second gas to thereby avoid turbulence generated externally of the plasma flame F, and further generates a high-temperature inert gas jet which absorbed heat from the plasma flame F, externally of the plasma flame F. Thus, particles comprising the droplet D are reduced in size with components of the particles being prevented from varying by virtue of the high-temperature inert gas jet, and further, accelerated, resulting in that the particles are protected from being oxidized by the second gas. Thus, it is possible to form the sprayed coating S which is further difficult to be oxidized.

Though both the first wire path 51*a* and the second wire path 52*a* in the present embodiment are designed to have a substantially rectangular cross-section extending in a direction in which the plasma flame F extends, one of them may be designed to have such a cross-section, in which case, the original deformation of the wire W can be released in a direction in which the plasma flame F extends, by means of the first wire path 51*a* or the second wire path 52*a* having a substantially rectangular cross-section extending in a direction in which the plasma flame F extends, to thereby supply a tip end of the wire W to a center of the plasma flame F.

INDUSTRIAL APPLICABILITY

The plasma spraying apparatus in accordance with the present invention is useful for forming an anti-corrosive sprayed coating on a surface of a steel structure.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A plasma spraying apparatus comprising:

a cathode;

a first gas nozzle surrounding a head of said cathode therewith to form a first gas path between said cathode and said first gas nozzle; and a second gas nozzle surrounding said first gas nozzle therewith to form a second gas path between said first gas nozzle and said second gas nozzle, wherein said second gas nozzle is formed with a wire path having a single wire inserted thereinto such that a distal end of said single wire is disposed in front of a nozzle opening of said second gas nozzle, wherein a first gas sprayed through said first gas nozzle is turned into plasma flame by arc generated between said cathode and said distal end of said single wire, said distal end of said single wire is molten into droplets by said plasma flame, and said droplets are sprayed onto a target by both said plasma flame and a second gas being sprayed through said second gas nozzle, and wherein said wire path has a substantially rectangular cross section having a longer side extending in a direction in which said plasma flame extends, said wire path causing said single wire to bend within an elastic limit of said single wire into a circular arc having a center situated at a first side of said single wire, and said cathode being situated at a second side of said single wire that is opposite to said first side of said single wire such that a portion of said single wire including said distal end of said single wire extends in said direction in which said plasma flame extends.

2. The plasma spraying apparatus as set forth in claim 1, wherein said substantially rectangular cross section of said wire path has a shorter side having a length greater than a diameter of said single wire by greater than or equal to 3% and less than 10%.

3. The plasma spraying apparatus as set forth in claim 1, wherein said wire path comprises a first wire path having an exit disposed in a vicinity of said nozzle opening of said second gas nozzle, and a second wire path inclined relative to said first wire path by a predetermined angle.

4. The plasma spraying apparatus as set forth in claim 3, wherein said predetermined angle is in a range of ≥1 degree to ≤5 degrees.

5. The plasma spraying apparatus as set forth in claim 3, wherein said first wire path and said second wire path are spaced away from each other.

6. The plasma spraying apparatus as set forth in claim 3, wherein said first wire path and said second wire path are spaced away from each other by greater than or equal to 3 millimeters and less than or equal to 10 millimeters.

7. The plasma spraying apparatus as set forth in claim 1, further comprising a third gas nozzle disposed between said first gas nozzle and said second gas nozzle to form a third gas path between said first gas nozzle and said third gas nozzle.

8. The plasma spraying apparatus as set forth in claim 1, wherein said substantially rectangular cross section of said wire path is chamfered at corners thereof such that said single wire does not make contact with said corners.

9. The plasma spraying apparatus as set forth in claim 1, wherein said substantially rectangular cross section of said wire path is rounded at corners thereof such that said single wire does not make contact with said corners.

10. The plasma spraying apparatus as set forth in claim 3, wherein said first wire path is linear.

11. The plasma spraying apparatus as set forth in claim 3, wherein said first wire path is curved.

12. The plasma spraying apparatus as set forth in claim 3, wherein said second wire path is linear.

13. The plasma spraying apparatus as set forth in claim 3, wherein said second wire path is curved.

14. The plasma spraying apparatus as set forth in claim 3, wherein said first wire path has a substantially rectangular cross section.

15. The plasma spraying apparatus as set forth in claim 3, wherein said second wire path has a substantially rectangular cross section.

16. The plasma spraying apparatus as set forth in claim 1, wherein a perimeter of said first gas path is parallel to a perimeter of said second gas path.

17. The plasma spraying apparatus as set forth in claim 7, wherein a perimeter of said first gas path is parallel to a perimeter of said second gas path and said perimeter of said second gas path is parallel to a perimeter of said third gas path.

18. The plasma spraying apparatus as set forth in claim 1, wherein said portion of said single wire including said distal end of said single wire extends parallel to said direction which said plasma flame extends.

* * * * *